United States Patent [19]
Whited

[11] 3,864,612
[45] Feb. 4, 1975

[54] FIRING ANGLE RETARDATION CONTROL

[76] Inventor: James Sidney Whited, Rt. 3, Box 501, Radford, Va. 24141

[22] Filed: Mar. 9, 1973

[21] Appl. No.: 339,581

[52] U.S. Cl. .............................. 318/341, 318/439
[51] Int. Cl. ........................................... H02p 5/16
[58] Field of Search ........... 318/138, 254, 257, 268, 318/297, 298, 341, 345, 439, 599

[56] References Cited
UNITED STATES PATENTS
3,624,837   11/1971   Albarda ......................... 318/341 X
3,731,172   5/1973   Kaufman ........................... 318/439

Primary Examiner—Robert K. Schaefer
Assistant Examiner—W. E. Duncanson, Jr.
Attorney, Agent, or Firm—Morgan, Finnegan, Durham & Pine

[57] ABSTRACT

In a full wave rectified control circuit for a D-C motor comprising two banks of silicon controlled rectifiers for forward and reverse operation, there is provided a pulse generating system which is responsive to an error signal and which applies a firing pulse to each of the control SCR's at varying times during the input cycle in order to vary the power input to the motor. The pulse generating system provides for overlap in the conduction periods of the forward and reverse banks of SCR's and provides each bank with a firing angle of up to 240° of the input waveform.

6 Claims, 6 Drawing Figures

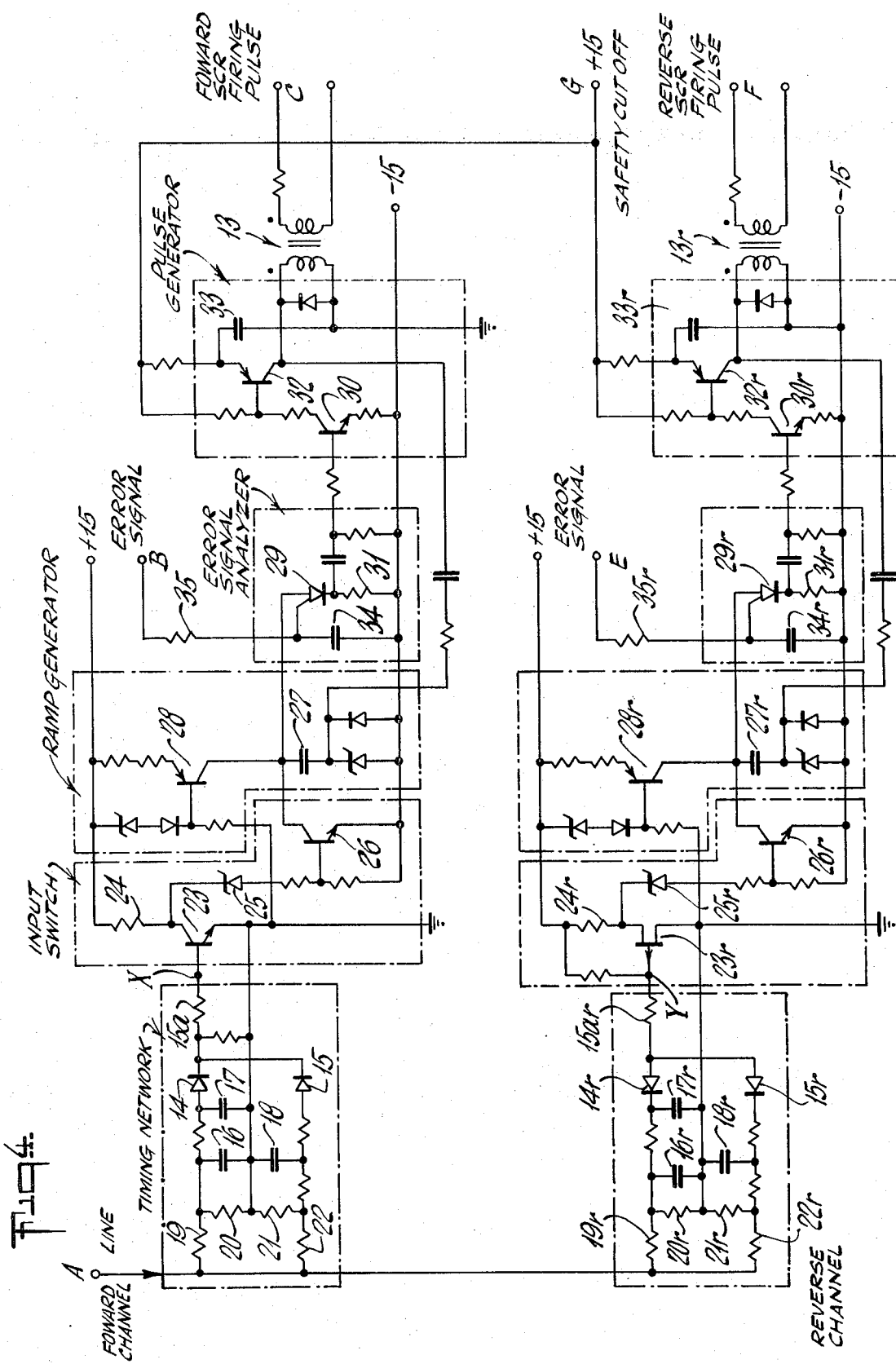

FIRING ANGLE RETARDATION CONTROL

BACKGROUND OF INVENTION

There are many different types of control circuits for industrial D-C motor application. However, one of the most practical is the full wave rectified system, which employs two banks of silicon controlled rectifiers each passing either forward or reverse current to the motor. The SCR's of this type of system are controlled by firing pulses applied to the gate terminals thereof at predetermined times during the input cycle. In this manner, a varying portion of the input waveform may be passed to the motor depending upon the performance demanded. Generally the firing pulses are applied by a simple pulse generator circuit which is controlled by an error signal, representing the difference between the actual motor speed and the desired motor speed. The pulse generator seeks the time during the input cycle necessary to fire the SCR's which will reduce the error signal to zero. In this manner, a constant control is maintained over the motor speed.

This type of circuit is relatively reliable at low speeds and small loads where the inertia and current demands of the motor are at a reduced level. However, as higher speeds and load conditions are approached, many problems begin to appear. At high speeds the inertia of the motor is significant and increases substantially the delay in motor response which in turn requires accurate regulation of the SCR firing times. Since the counter emf of the motor also increases with the motor speed, large reverse current surges can occur unless reverse current conduction can be strictly controlled. In many systems the firing pulses to the reverse conducting SCR banks may be lost at high speeds shutting down the reverse bank and creating further response delays as a certain amount of time is necessary to refire the SCR. All of these factors cause discontinuities in the motor control power which may result in excessive heating, flashover, limitations of peak motor performance, and speed fluctuation.

The above problems are aggravated by the time difference between the change in power to the motor and the actual response of the motor. The range of variation of control power which is necessary to obtain a corresponding response in motor performance is sometimes referred to as the deadband of the system.

In the more sophisticated systems, the pulse generator circuit fires the forward and reverse SCR banks so that they have overlapping periods of conduction. These periods are logically referred to as overlap and generally occur at or near constant speed. This greatly facilitates the reduction of deadband and makes the control system more flexible. In these systems, the speed of the motor is varied by advancing or retarding the firing angle of the SCR's while maintaining an equal forward and reverse current circulation at constant speed.

Prior Art

The existing systems reference their control to the zero crossover of the input sinewave, advancing the firing of one set of SCR's therefrom and retarding the firing of the other set of SCR's thereto. Generally at constant speed the firing angles of the SCR's are identical and close to the zero crossover of the input waveform. Since the SCR's will remain conducting once triggered until they sense a current reversal, it can be observed that triggering of the forward SCR's can be advanced a full 180°. However, the reverse SCR's are very limited in their ability to retard. This situation changes when the motor is in motion since a counter emf is induced in the armature and the presence of a back emf delays the point of current reversal of the reverse SCR's allowing a greater degree of retardation.

Since the disparity in applied power for the same firing angle during the forward and reverse conduction periods is related to the magnitude of the back emf, it is seen that the effect is greater at high speeds than at low speed. In existing control circuits the associated SCR firing pulse systems are referenced to the input waveform and even in the better systems, the maximum retardation obtainable is to the zero crossover. Although this range is sufficient for low performance systems, new demands in the machine tool industry require a much higher degree of performance which the present systems are incapable of providing.

It is therefore an important object of this invention to provide a high performance control system for a D-C motor by eliminating the restrictions on the retarding firing angle of the reverse SCR's.

In addition high performance, i.e., minimum dead band, is achieved by providing overlap at no load which is independent of motor speed.

Other objects of this invention are to provide a firing angle capability of at least 240° for each bank of SCR's and to implement improved timing and pulse generation circuitry.

BRIEF DESCRIPTION OF THE INVENTION

The control system of the subject invention provides full wave rectified power to a D-C motor by virtue of two banks of silicon controlled rectifiers. One of said banks passes full wave rectified power in the forward motor direction and the other passes full wave rectified power in the reverse motor direction. Each bank has two SCR's connected to the motor and to opposite sides of the power supply. The gate terminals of each SCR are connected to a pulse generator circuit which transmits firing pulses to the SCR's according to an error signal which represents the difference between actual motor speed and desired motor speed. The pulse generator circuit is provided with a timing network which provides an operating range of 240° of the input cycle. This enables the SCR's to be fired at varying times throughout this range and permits the firing angle of the reverse SCR's to be retarded past the zero crossover of the input cycle to take advantage of the delay in current reversal caused by the buildup of a back emf.

BRIEF DESCRIPTION OF THE DRAWING

The instant invention is more fully described in conjunction with the appended drawing which shows a preferred embodiment of the invention and in said drawing:

FIG. 4 is a circuit diagram showing a pulse generator system of the type employed in the preferred embodiment.

THE PREFERRED EMBODIMENT

Figure 1:
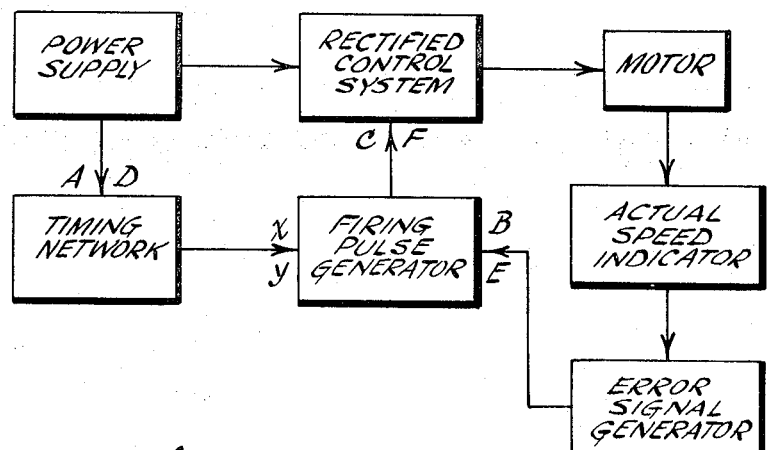
FIG. 1 is a block diagram of the main components of this invention.

The basic systems associated with the preferred embodiment of this invention are shown in the block diagram of FIG. 1. Basically, a power supply feeds the rectified control system including forward and reverse SCR banks to obtain rectified power to the motor. The input waveforms also provide a reference input to the timing network for developing a timing signal for the firing pulse generator, the latter pulse generator being responsive to an error signal.

Figure 2:
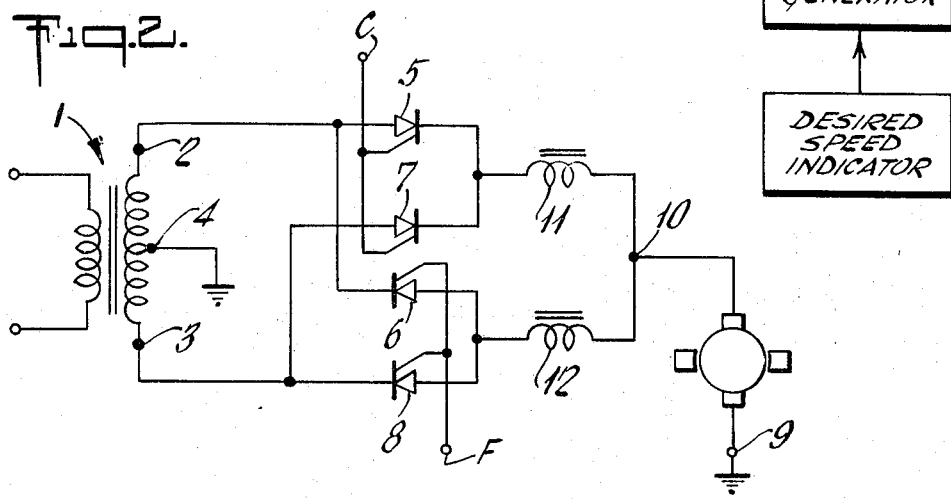
FIG. 2 is a circuit diagram showing a typical single phase full wave rectifier system.

Referring to FIG. 2, the power supply may be a standard alternating current source which is connected to the control circuit by means of an isolation transformer 1 having terminals 2 and 3 and center tap 4. Transformer terminal 2 is connected to forward current conducting SCR 5 and to reverse current conducting SCR 6. Transformer terminal 3 is connected to forward current conducting SCR 7 and to reverse current conducting SCR 8. The center tap of the transformer is connected to motor armature terminal 9 which may be the common reference or ground. Forward SCR's 5 and 7 are connected to the motor armature terminal 10 through smoothing inductance 11. Reverse SCR's 6 and 8 are connected to the motor armature terminal 10 through smoothing inductance 12.

The pulse generator system is comprised of two channels which are substantially identical in operation. One channel fires forward SCR's 8 and 7 and the other channel fires reverse SCR's 6 and 8. For simplicity, the structure and the operation of only one channel will be discussed here and the interrelation of the channels will be described in a later portion of this specification.

Briefly, firing pulses are generated as follows: A timing signal from the timing network initiates the generation of a ramp signal. The ramp signal is compared with the motor speed error signal to fire a pulse to the SCR's when the difference between these signals reaches a predetermined point. In this manner, firing pulses occur at a time relative to the error signal but only during the time period regulated by the timing pulse.

Figure 3:
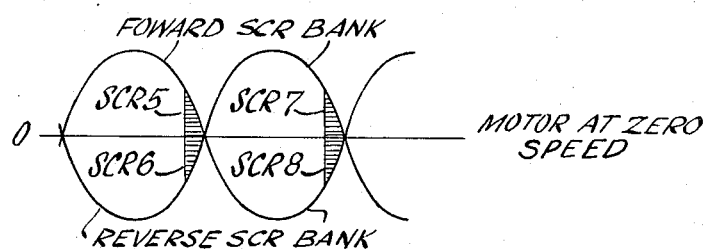
FIG. 3 is a graph showing the input waveforms at terminals 2 and 3 of the circuit of FIG. 2 with the firing angle of each SCR at zero motor speed.
Figure 3A:
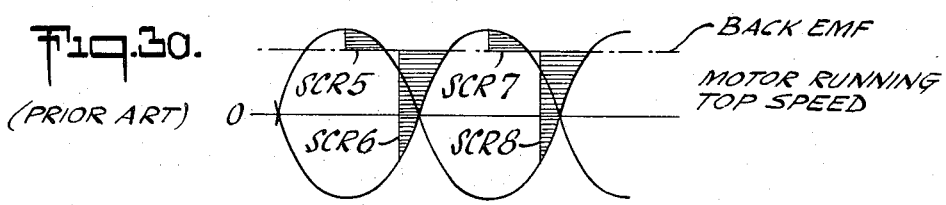
FIG. 3a is a similar graph showing the firing angles of the typical prior art system with restricted retardation while the motor is running at top speed.
Figure 3B:
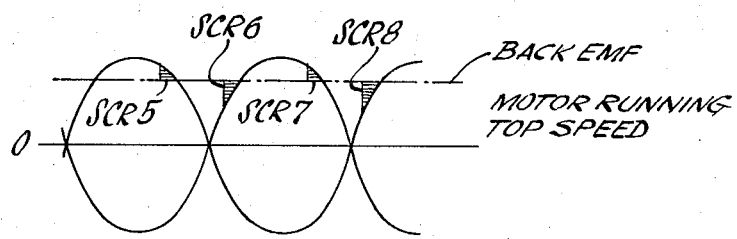
FIG. 3b is a similar graph showing the firing angles of the system of this invention with unrestricted retardation while the motor is running at top speed.

FIG. 3 illustrates the waveforms present at terminals 2 and 3 of the transformer 1 with the motor at zero speed. FIG. 3a illustrates the restricted retardation in the firing angles of the reverse current conducting SCR's in the typical prior art system. FIG. 3b illustrates the unrestricted retardation in the firing angles of the reverse current conducting SCR's in the subject invention which are beyond zero crossover.

Referring to FIG. 4, the gate terminals of the forward SCR's 5 and 7 are coupled to the forward pulse generator channel through transformer 13 at terminal C of the pulse generator circuit. Although there are many functionally equivalent arrangements which can be used, the circuit of FIG. 4 has been found to be particularly effective.

A timing network which utilizes diodes 14 and 15 and capacitors 16, 17, and 18 is connected to the main A-C line through the voltage divider consisting of resistances 19, 20, 21 and 22. This network effectively stretches the positive portion of the input waveform sensed by enabling transistor 23 and develops a timing signal which bridges the zero crossover of the input waveform and serves as an enabling signal for the pulse generator.

The collector of transistor 23 is connected through resistor 24 to plus 15 volt D-C source and through diode 25 to the base of transistor 26. In this manner, transistor 23 controls the conduction of transistor 26. The emitter of transistor 26 is connected to a minus 15 volt D-C source. The collector of transistor 26 is connected to a ramp generator consisting of capacitor 27 and the constant current source associated with transistor 28 which is powered by a 15 volt D-C source. The ramp signal is applied through capacitor 27 to the anode of programmable unijunction transistor 29, the gate of which receives a portion of the motor speed error signal which is impressed on terminal B across resistor 35 and capacitor 34. The difference between the instantaneous value of the ramp signal and the error signal controls the conduction of transistor 29. The cathode of unijunction transistor 29 is connected to the base of pulse generator 30 and to a minus 15 volt D-C reference potential through resistor 31. Pulses across resistor 31 will cause transistor 30 to conduct and since the base of transistor 32 is connected to the collector of transistor 30, transistor 32 will also conduct thereby providing a discharge path for capacitor 33 through the primary of transformer 13.

Operation

The input voltage waveform is impressed at terminal A across the timing network and transistor 23 of the pulse generator system. The input voltage is dropped by voltage divider 19, 20, 21, and 22 and applied to the terminals of phase shifting capacitors 16, 17, and 18. Diodes 14 and 15 allow only the positive half cycle of the input waveform to pass to enabling transistor 23. A small amount of lag is introduced by a small valued capacitor 18 and the slightly delayed initial part of the positive half cycle is transmitted through diode 15 to the summing resistor 15A. Capacitors 16 and 17 create a lag of about 60° in the current passed by diode 14 and when this is summed in resistor 15a with the current passed by diode 15, the voltage at point X will be effectively stretched beyond the positive half cycle. This results from the relative discharge of capacitors 16, 17, and 18. The positive portion of the cycle sensed by the base of enabling transistor 23 is therefore approximately 240°. Transistor 23 is selected to conduct only on the positive portion of the input waveform.

When the base of transistor 23 senses zero voltage, it will not conduct. This effectively places 30 volts D-C across resistor 24 and the emitter of transistor 26 causing this transistor to conduct. Capacitor 27 will then be shorted to ground and will discharge bringing the anode of programmable unijunction transistor 29 towards a minus 15 volts D-C. The anode of transistor 29 will be more negative than its gate and will not fire.

As the base of transistor 23 becomes positive, during the timing signal from the timing network, it will conduct thereby turning off transistor 26. Capacitor 27 will then begin to charge to 15 volts D-C by virtue of the constant current source of transistor 28. An error signal which represents the difference in actual motor speed and desired motor speed is applied at terminal B and will determine the voltage to which capacitor 34 will charge. The gate of unijunction transistor 29 is held at this value. It can be observed that as capacitor 27 charges and the anode of transistor 29 becomes more positive than the gate, this transistor will fire, creating a pulsed voltage across resistor 31. This pulse will cause transistors 30 and 32 to conduct, providing a path for the discharge of capacitor 33 through pulse transformer 13, the secondary of which is connected to the gates of the forward SCR's 5 and 7.

The forward and reverse channels are essentially identical except the reverse channel is held in the operating mode for the negative portion of the input waveform. This portion is stretched out to about 240° in a manner similar to the forward channel. In order to accomplish this negative half cycle operation, the input switch circuit of the reverse channel utilizes a field effect transistor 23r in place of the NPN transistor and proper basing for the F.E.T. transistor 23r is provided by resistor 36r.

As the error signal at terminal B becomes more negative (i.e., acceleration of motor speed is demanded), the firing angle of the forward SCR's 5 and 7 will advance to an earlier time in the input waveform since capacitor 27 will not have to charge as long to render the anode of transistor 29 more positive than its gate. Similarly, when acceleration is demanded, the error signal at terminal E goes more positive, and the firing angle of the reverse SCR's 6 and 8 will retard to a later time in the input waveform. The error signals of terminals B and E are necessarily the mirror image of each other. At constant speed, the error signal is small, but will provide a small period of conduction in both banks, thereby creating the desired constant overlap.

The capacitor 33 is charged by a 15 volt D-C source at terminal G which can be used as an emergency cutout. If the system malfunctions, this voltage could be removed, thereby depriving capacitor 33 of its charge and rendering the pulse generator inoperative.

The pulse generator system can be used for a variety of supply configurations by adding or eliminating channels. In this manner, all combinations of half wave rectified, full wave rectified, and multiple and single phase power circuits can be accommodated. Additionally, the control circuit is arranged so as to be independent of phase sequence, thereby greatly facilitating the installation of multiple phase system and removing the danger of improper phase connection which exists in prior circuits.

One measure of the efficiency of a motor control system is its current form factor which is the ratio of the r.m.s. motor current to the average motor current. In the prior art system, this factor increases with motor speed thereby placing a limit on motor performance. However, in the subject system, the current form factor actually decreases with increasing speed, greatly improving the high speed performance of the motor.

I claim:

1. A control system for a D-C motor operable from an alternating current input power supply comprising:
   A. a control circuit connected to the power supply and to the motor to provide rectified power to the motor;
   B. a gated rectifying network in the control circuit including a first bank of forward conducting SCR's and a second bank of reverse conducting SCR's which are rendered conductive by firing pulses;
   C. a pulse generating system including means for generating a ramp signal, and means responsive to the ramp signal and an error signal for producing firing pulses when a predetermined relationship exists between the ramp signal and the error signal; and
   D. means for developing a timing signal referenced to the alternating current input signal from the power supply, said timing signal means coupled to the pulse generating system for regulating the duration of the ramp signal to provide for the generation of firing pulses over an operating range unrestricted by the zero crossover point of the alternating current input signal.

2. A control system for a D-C motor as described in claim 1 wherein the control circuit and rectifying network comprises:
   A. an isolating power transformer connected to the power supply having first and second output terminals and a center tap, the center tap being connected directly to one side of the motor;
   B. said first bank of forward conducting SCR's including first and second forward current passing SCR's connected to the first and second transformer terminal respectively and to the other side of the motor through a smoothing inductance; and
   C. said second bank of reverse conducting SCR's including first and second reverse current passing SCR's connected to the first and second transformer terminals respectively, and to the other side of the motor through a smoothing inductance.

3. A control system for a D-C motor as described in claim 2 wherein the pulse generator system is comprised of two substantially identical channels, one providing firing pulses for the first and second forward current passing SCR's and the other providing firing pulses for the first and second reverse current passing SCR's.

4. A control system for a D-C motor as described in claim 3 wherein there is provided a separate timing means for each channel, providing each pulse generator channel with an operating range of greater than 180° of the input waveform.

5. A control system for a D-C motor as described in claim 1 wherein the timing means comprises a capacitor network which effectively stretches the positive portion of the input waveform to greater than 180°.

6. A control system for a D-C motor operable from an alternating current input power supply comprising:
   A. a control circuit connected to the power supply and to the motor to provide rectified power to the motor;
   B. a gated rectifying network in the control circuit which is rendered conductive by firing pulses;
   C. a pulse generating system which provides firing pulses to the gated rectifying network;
   D. means to supply to the pulse generator system an error signal which represents the difference between actual motor speed and desired motor speed;
   E. said pulse generating system including:
      1. a first transistor which conducts during the presence of a timing signal,
      2. a second transistor which is turned off by the conduction of the first transistor,
      3. a first capacitor which is short circuited to ground by conduction of the second transistor, 4. a constant current source connected to charge the first capacitor,
5. a second capacitor which is charged by the error signal means,
6. a programmable unijunction transistor having its anode connected to the first capacitor and having its gate connected to said second capacitor such that it will fire when said first capacitor is charged to a value more positive than the charge on said second capacitor, and
7. a pulsing circuit which transmits firing pulses to the gated rectifying network when the programmable unijunction transistor is fired; and
F. means for developing a timing signal referenced to the alternating current input signal, said timing signal means coupled to the pulse generating system to provide for the generation of firing pulses over an operating range unrestricted by the zero crossover point of the alternating current input signal.

* * * * *